April 23, 1963
R. DIDCHENKO ET AL  3,086,925
PREPARATION OF REFRACTORY SULFIDES
Filed Oct. 19, 1960
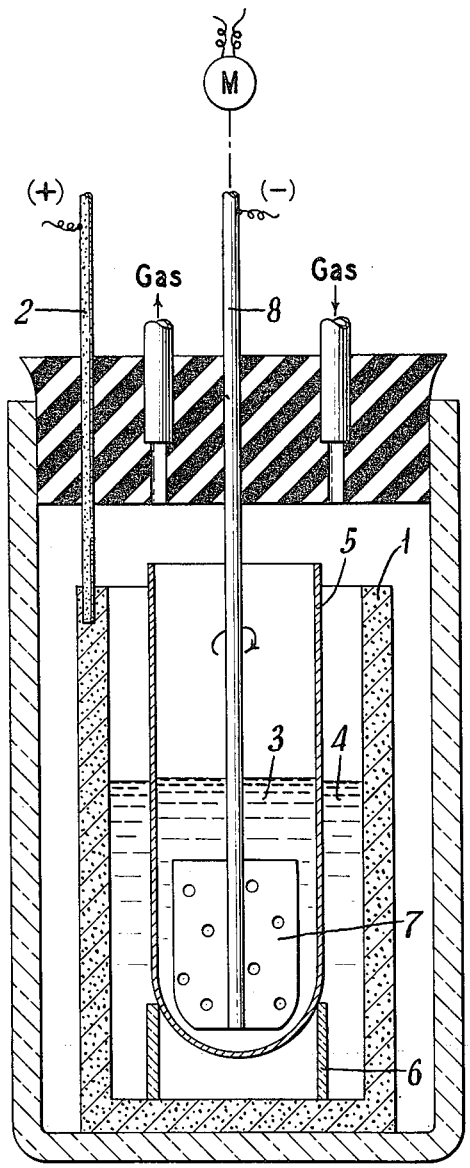
INVENTORS
ROSTISLAV DIDCHENKO
LAWRENCE M. LITZ
BY *John F. Hohmann*
ATTORNEY 3,086,925
PREPARATION OF REFRACTORY SULFIDES
Rostislav Didchenko, Middleburgh Heights, and Lawrence M. Litz, Lakewood, Ohio, assignors to Union Carbide Corporation, a corporation of New York
Filed Oct. 19, 1960, Ser. No. 63,461
12 Claims. (Cl. 204—1.5)

This invention relates to an electrolytic process for the preparation of refractory lower sulfides of lanthanides and actinides.

The refractory lower sulfides of lanthanide and actinide metals such as cerium, uranium, and thorium are resistant to attack by very reactive molten metals such as titanium, uranium, sodium, aluminum, etc. These lower sulfides are metallic in character as is evidenced by their good electrical conductivity, good machinability and excellent thermal shock resistance. They have high melting points, and may be fabricated into shapes by conventional powder metallurgy techniques such as pressing and sintering. These properties make these lower sulfides very attractive as refractory materials for industrial and laboratory applications.

The principal object of this invention is to provide a process by which the lower sulfides of lanthanide and actinide elements may be prepared.

Other objects will be apparent from the disclosure and appended claims.

The objects are achieved by the discovery that a good yield of high-purity lanthanide or actinide lower sulfide may be obtained by the fused salt electrolysis of an electrolyzable, oxygen-free chemical system containing a sulfide compound, and a lanthanide or actinide compound wherein the metal component has a higher valence than that of the desired sulfide. The system may be made electrolyzable by the inclusion of a suitable electrolyte such as a metal halide; the halide of the lanthanide or actinide may be suitable for this purpose. By "oxygen-free" is meant that substantially no oxygen, combined or elemental, is present in the system.

The invention may be more clearly understood by reference to the single FIGURE.

The figure represents a typical crucible assembly which may be employed for the fused salt electrolysis of this invention. Crucible 1 is made anodic by means of anode connector 2. The catholyte 3 and anolyte 4 are separated by diaphragm 5 which rests on support ring 6. The cathode 7 also acts as a stirrer by connecting shaft 8 to a motor.

The lanthanide or actinide is introduced into the electrolysis crucible as a compound wherein the lanthanide and actinide metals have a valence greater than two. The compound, for example, may be a halide, sulfide or halosulfide. However, other oxygen-free compounds may be employed provided the non-lanthanide or actinide components of such compounds are non-interfering in the monosulfide formation reaction.

Both the sulfide compounds and halide compounds may be lanthanides or actinides as indicated above. However, it is not necessary that they both be such so long as the compounds are free of oxygen and contain only non-interfering components. Sodium sulfide and cerium chloride are examples of compounds that are suitable reactants. Examples of possible overall reactions for various starting mixtures may be represented by the following general equations:

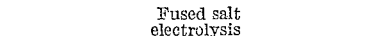
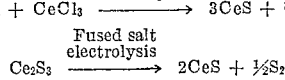

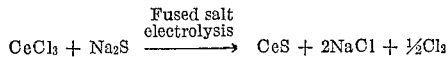

The electrolyte may be any oxygen-free salt or mixture of salts which are electrolytic conductors in the molten state and which are not reduced in preference to cerium having a valence greater than two. Alkali halides and alkaline earth halides and mixtures thereof, and in particular, sodium chloride and the sodium chloride-potassium chloride eutectic mixture in the molten state, serve as good electrolytes for the purposes of this invention. It is also possible to use such a large excess of cerium trichloride that a fluid, electrically conductive bath can be maintained during the course of electrolysis without the use of any other electrolyte.

To obtain maximum purity, it is desirable that all the components in the electrolytic bath be substantially free of oxygen in any form, such as in air and moisture, in order to prevent the formation of the oxysulfide rather than the monosulfide. For the same reason, the atmosphere in contact with the melt should be substantially free of oxygen and moisture. An inert gas such as argon may be employed to shield the melt from an oxidizing atmosphere.

The electrolysis is generally insensitive to change in temperature within the operable range. The lower limit of the range is the temperature at which the electrolyte is liquid and conductive. The upper limit is set below the temperature at which any of the melt constituents evaporate at an undesirably high rate.

The optimum voltage depends upon the composition of the melt. In general, little, if any, cerium monosulfide can be obtained at an applied voltage of less than 4 volts in the reduction of cerium sulfide, $Ce_2S_3$, with a sodium-chloride potassium chloride eutectic as the base electrolyte. However, it was found that the addition of anhydrous cerium chloride made possible cerium monosulfide formation at potentials as low as 3.6 volts.

The current density is not critical in these systems and wide current ranges have been used. If less than the theoretical quantity of charge required for complete reduction to the desired valence is passed through the system, the monosulfide product may be contaminated with unreduced material. In order to insure complete reduction to the monosulfide, it is recommended that an excess of current of from one and one-quarter to twice the theoretical quantity be employed.

The invention may be more clearly understood from the following examples:

A charge comprising 35 grams of cerium sulfide, $Ce_2S_3$, 35 grams of cerium trichloride and 225 grams of the sodium chloride-potassium chloride eutectic mixture was loaded into an electrolytic cell so that the anode compartment contained only electrolyte, the remainder of the electrolyte and the cerium salts going into the cathode compartment. The anode was a graphite crucible having an outside diameter of 2⅜ inches, a wall thickness of ¼ inch and a height of 4 inches. An alumina extraction thimble resting on a short porcelain ring in the crucible served as the diaphragm separating the anode and cathode compartments. A molybdenum stirrer, inserted in the center of the thimble, served as the cathode.

The entire assembly was inserted in a flat-bottomed quartz tube which was closed at the top with a rubber stopper. An inert gas, such as nitrogen or argon, was passed into the cell chamber during any period when the cell was hot to prevent air oxidation. In addition to the gas inlet and outlet, openings were provided in the stopper for a thermocouple well, and cathode-stirrer, and the anode connector. The latter was usually a ⅛ inch diameter carbon or graphite rod whose end was tapered so that a snug fit would be made in the hole in the top of the crucible.

A spring-loaded brush commutator carried the current to the stirrer shaft and a simple battery clip was used on the anode connector. A 12-volt direct current motor generator served as the current source. Variable resistors in series with the cell gave voltage control and conventional ammeter, voltmeter, and ampere-hour meter instruments were used to measure the electrolysis variables. A crucible furnace, coupled with an automatic temperature controller, was used to heat the assembly.

The bath temperature was brought to about 850° C. and, with the salts molten, the stirrer was started. After connecting direct current input leads, the cell voltage was raised to about 5.0 volts and held there until about 15 ampere-hours of 6 to 7 ampere current had passed through the cell. The assembly was then removed from the furnace and cooled. It was then taken apart in a dry-box, and the product, admixed with some of the electrolyte, removed from the cathode compartment. This salt was distilled away from the product at 700–1000° C. with a vacuum of 1–10 microns. By this method, 42 grams of cerium monosulfide were produced which represented a yield of 87 percent based on the sulfur content of the higher sulfide.

Following the same procedure, CeS was also prepared by electrolyzing a charge containing 15 grams of cerium sulfide, 130 grams of the sodium chloride-potassium chloride eutectic and no cerium trichloride with 6 ampere hours of 3 to 3.5 ampere current.

In another example of the process of the invention, a mixture of 90 grams of anhydrous cerium trichloride and 80 grams of the sodium chloride-potassium chloride eutectic was preelectrolyzed at 750° C. to remove oxygen-containing contaminants. A current of 0.2 to 0.4 ampere at 2.0 to 2.3 volts was passed through the melt for about 2 hours. The melt was solidified, broken up and charged into the anode and cathode chambers of an electrolysis cell.

A crucible containing a sulfide melt consisting of 10 grams NaCl—KCl eutectic and 15.6 grams of anhydrous $Na_2S$ was put bottom-up over the cathode compartment and the whole assembly was placed in an argon-swept glass tube. The electrolysis cell was then heated inductively until the sulfide melt flowed into the cathode compartment and mixed with cerium trichloride. The crucible was then removed, the cathode put in place, and the cell heated in an electric resistance furnace to 850° C.

The cathode was kept a few millimeters above the bottom of the diaphragm and rotated at 80 to 100 revolutions per minute. A current of 3 to 4.5 amperes at 4.0 to 5.0 volts was passed through the cell for 3½ hours after which time the current was stopped and the melt was stirred for 1½ hours. The cathode was then raised and the melt was allowed to cool to room temperature.

The product in the cathode compartment was distilled at 800° C. to 900° C. under a few microns pressure of purified argon to remove alkali metals, their chlorides and excess cerium chloride. The residual cerium monosulfide was transferred to a molybdenum crucible and heated slowly up to 1200° C. at a few microns pressure of an inert gas and then up to 1700° C. to 1900° C. while the pressure was reduced to $10^{-4}$ to $10^{-5}$ millimeters of mercury. After cooling in an inert atmosphere, 24 grams of cerium monosulfide were obtained, a yield of 75.5 percent based on the amount of sulfur added as $Na_2S$.

In an example of the preparation of thorium monosulfide by the method of the present invention, 37.4 grams (0.1 mole) of anhydrous thorium chloride and 17.8 grams (0.1 mole) of anhydrous sodium sulfide were mixed together and put in the bottom of a fused alumina refractory cup diaphragm. The electrolytic cell was assembled and filled with a sodium chloride-potassium chloride eutectic mixture. An electrolytic current of 4 to 6 amperes at 4.4 to 5.0 volts was passed through the cell for 150 minutes in the same manner as in the previous examples. A total of 11.0 ampere-hours of current was employed, which is about twice the theoretical requirement for reduction of tetravalent thorium to divalent thorium. The product was purified in the same manner as the cerium monosulfide. Twenty-one grams of thorium monosulfide were so obtained, a yield of 78 percent based on the amount of thorium originally present as the tetrachloride.

Lanthanum trisulfide (18.5 g.) was put on the bottom of a steel crucible and covered with a mixture of 25 g. anhydrous lanthanum trichloride and 120 g. sodium chloride that had been previously carefully dehydrated by bubbling purified argon through the molten salt.

After inserting the entire apparatus into a vertical resistance furnace, the charge became molten and the temperature at the bottom of the crucible was regulated at 850° C. The electrolysis was conducted with a current of 4.0 amperes at 3.4 to 3.7 volts; thus, a total of 18 ampere-hours passed through the melt. After pulling out the anode and the diaphragm tube from the melt, the crucible was cooled, transferred to a vacuum system and the salt distilled off at 1000° C. and $10^{-4}$ mm. Hg.

Twenty two grams of golden crystalline powder was recovered from the bottom of the crucible. It analyzed as $LaS_{0.98}$ and represented a 90 percent yield based on the trisulfide.

Gadolinium trisulfide (22.8 g.), anhydrous gadolinium trichloride (25.0 g.) and sodium chloride (120 g.) were charged in the steel crucible and treated in the identical manner as described immediately above. Twenty-two grams of copper-colored powder were recovered (yield based on trisulfide: 70 percent). It analyzed as $GdS_{0.96}$.

The following charge

| | G. |
|---|---|
| $YbS_3$ | 18.0 |
| $YbCl_3$ | 20.0 |
| NaCl | 120.0 | was electrolyzed at 15 ampere-hours, 3.5–4 volts and 4 amp. and 21.8 g. of black powder recovered after vacuum distillation (88 percent yield). Analysis: $YbS_{0.93}$.

The electrolysis was conducted in laboratory apparatus shown in the drawing.

The higher sulfide of uranium, and the higher sulfides of a rare-earth mixture containing all the normal components and of a rare-earth mixture with the bulk of the cerium removed, referred to as "didymium" earths, were prepared together with the chlorides of these three systems. These were then mixed with sodium chloride in a fused salt bath and electrolyzed in a manner similar to that used for cerium monosulfides. In all cases, the higher sulfides were reduced to the monosulfide as identified by the X-ray diffraction patterns of the product.

The starting material for the uranium monosulfide preparation was $UO_3$. A mixture containing 150 g. of $US_2$, 197 g. of $UCl_4$ and 400 g. of NaCl was placed in a steel can and heated to 950° C. under which conditions the chloride salts formed a molten solution with the sulfide lying in the bottom of the steel can. A central graphite anode was used, shielded by a refractory sleeve so as to concentrate the active current area to the bottom in the manner described for the cerium monosulfide preparation. The steel can was the cathode of the electrolysis circuit. Forty-seven ampere hours were passed over a period of three hours at voltages ranging from 3.7 to 3.8 and a current of approximately 15 amperes. The back E.M.F. under these conditions was 1.3 to 1.4 volts. Following the electrolysis, the charge was held at 950° C. for one hour to permit equilibration with the reducing species in this system before cooling to room temperature.

The product was washed free of salt with water and the dried water insoluble material was examined by X-ray diffraction. The X-ray pattern was identified as that of uranium monosulfide contaminated with uranium oxysulfide.

The starting material for the rare-earth monosulfide preparation contained 42.2 wt. percent cerium oxide, 29.0 percent lanthanum oxide, 19.1 percent neodymium oxide, 6.6 percent praseodymium oxide, 3.1 percent samarium oxide, with the balance being small amounts of the other rare-earths. The electrolysis mixture contained 135 g. of the normal rare-earth sulfides, 200 g. of the chlorides and 400 g. of sodium chloride. The arrangements of the electrolysis cell was as described above. The electrolysis was carried out at 950° C. with the voltage between 4.5 to 5.0 volts. Forty-six ampere hours were passed through the system over a period of five hours during which time the back E.M.F. ranged from 2.2 to 2.8 volts. After termination of the electrolysis, the charge is held at 950° C. for two hours before cooling. X-ray analysis identified the product as the mixed monosulfide with a typical face-centered cubic pattern. As in the above case, contamination with oxygen resulted in the formation of some oxysulfide.

The "didymium" oxide mixture had the following composition: cerium oxide, 2.28 percent; lanthanum oxide, 49.1 percent; neodymium oxide, 33.6 percent; praseodymium oxide, 10.3 percent; samarium oxide, 4.8 percent with the balance being small amounts of the other rare-earths. The electrolysis mixture contained 52.6 g. of the normal "didymium" sulfides, 80.4 g. of the "didymium" chlorides and 200 g. of sodium chloride. Electrolysis was again run at 950° C. as described above. The voltage varied between 3.6 and 4.0 volts, to give a current of approximately 10 amperes and a back E.M.F. from 2.3 to 2.5 volts. Eighteen ampere-hours were passed. The charge was held at 950° C. for one hour before cooling to room temperature. The X-ray diffraction pattern of the water-leached product showed a very strong monosulfide pattern with some oxysulfide impurity.

The results demonstrate conclusively that the monosulfides of the other elements in both the rare-earth and actinide earth series can be produced by the fused salt electrolytic technique employed for the production of CeS.

Several factors have been found to affect the yield of the reaction. For example, agitation of the electrolyte has been found to be quite beneficial. This may be conveniently, though not necessarily, accomplished by using the cathode as the stirrer.

Metals resistant to the sulfide in the melt such as molybdenum and tantalum are quite satisfactory. Steel cathodes may also be satisfactory in some applications.

Though the metallic cathodes just mentioned are not seriously attacked by the molten salt, the chlorine vapor in the atmosphere above the melt is quite corrosive. Protective sleeves of graphite, carbon or other inert materials have been employed to protect the stirrer shafts in the region immediately above the melt.

In the examples, the product did not generally adhere to the cathode but was present as a solution or slurry throughout the available volume. A diaphragm was used in the cell to obtain reasonable current efficiencies and minimize chlorination of the product at the anode surface. Porous cups of fused alumina refractories, sheets of molybdenum, iron and steel, perforated to allow ionic conduction through them, were found to be satisfactory diaphragms. The molybdenum diaphragm is preferred among the metallic diaphragms since it is less susceptible to attack by the sulfide.

The process of the invention has been described with respect to a particular type of apparatus. However, no apparatus limitation is intended in the practice of the present invention.

This application is in part a continuation of our previous application Serial No. 647,610, filed March 21, 1957, now abandoned.

What is claimed is:
1. A process for preparing a refractory monosulfide of a metal selected from the group consisting of lanthanide and actinide metals and mixtures thereof, comprising electrolyzing in a substantially oxygen-free atmosphere, a substantially oxygen-free electrolytic molten salt consisting essentially of at least one sulfide of said metals wherein said metals have a valence greater than in said monosulfide, and a fused salt consisting of at least one halide of a metal selected from the group consisting of alkali and alkaline earth metals and combinations thereof; and continuing said electrolyzing until said monosulfide is formed.

2. A process for preparing a refractory monosulfide of a metal selected from the group consisting of lanthanide and actinide metals and mixtures thereof, comprising electrolyzing in a substantially oxygen-free atmosphere, a substantially oxygen-free electrolytic bath consisting essentially of at least one sulfide of said metals wherein said metals have a valence greater than in said monosulfide, at least one halide of said metals and a fused salt electrolyte consisting of at least one halide of a metal selected from the group consisting of alkali and alkaline earth metals and combinations thereof; and continuing said electrolyzing until said monosulfide is formed.

3. A process for preparing cerium monosulfide, which comprises electrolyzing in a substantially oxygen-free atmosphere, a substantially oxygen-free electrolytic molten salt consisting essentially of at least one sulfide of cerium, wherein said cerium has a valence greater than said monosulfide, and a fused salt electrolyte consisting of at least one alkali metal halide, and continuing said electrolyzing until cerium monosulfide is formed.

4. A process for preparing cerium monosulfide, which comprises electrolyzing in a substantially oxygen-free atmosphere, a substantially oxygen-free electrolytic molten bath consisting essentially of at least one sulfide of cerium, wherein said cerium has a valence greater than in said monosulfide, at least one halide of cerium, and a fused salt electrolyte consisting of at least one alkali metal halide, and continuing said electrolysis until cerium monosulfide is formed.

5. A process for preparing thorium monosulfide, which comprises electrolyzing in a substantially oxygen-free atmosphere, a substantially oxygen-free electrolytic molten bath consisting essentially of at least one sulfide of thorium, wherein thorium has a valence greater than in the monosulfide, at least one halide of thorium, and a fused salt electrolyte consisting of at least one alkali metal halide, and continuing said electrolysis until thorium monosulfide is formed.

6. A process for preparing cerium monosulfide which comprises electrolyzing in a substantially oxygen-free atmosphere a substantially oxygen-free electrolytic molten bath consisting essentially of at least one sulfide of cerium wherein the cerium has a valence greater than in the monosulfide and at least one halide of cerium, and continuing said electrolysis until cerium monosulfide is formed.

7. A process for preparing thorium monosulfide which comprises electrolyzing in a substantially oxygen-free atmosphere a substantially oxygen-free electrolytic molten both consisting essentially of at least one sulfide of thorium wherein the thorium has a valence greater than in the monosulfide, and at least one halide of thorium, and continuing said electrolysis until thorium monosulfide is formed.

8. A process for preparing a refractory monosulfide of a metal selected from the group consisting of the lanthanide and actinide metals and mixtures thereof, comprising electrolyzing in a substantially oxygen-free atmosphere, a substantially oxygen-free bath consisting essentially of at least one halide of said metals and a sulfide of a metal selected from the group consisting of the alkali and alkaline earth metals and continuing said electrolyzing until said monosulfide is formed.

9. A process for preparing lanthanum monosulfide comprising electrolyzing in a substantially oxygen-free atmosphere, substantially oxygen-free lanthanum trichloride, lanthanum trisulfide and sodium chloride and continuing said electrolyzing until said monosulfide is formed.

10. A process for preparing gadolinium monosulfide comprising electrolyzing in a substantially oxygen-free atmosphere a mixture of gadolinium trisulfide, anhydrous gadolinium trichloride and sodium chloride and continuing said electrolyzing until said monosulfide is formed.

11. A process for preparing ytterbium monosulfide comprising electrolyzing in a substantially oxygen-free atmosphere a mixture of ytterbium trisulfide, ytterbium trichloride and sodium chloride and continuing said electrolyzing until said monosulfide is formed.

12. A process for preparing uranium monosulfide comprising electrolyzing in a substantially oxygen-free atmosphere a mixture consisting of uranium disulfide, uranium tetrachloride and sodium chloride and continuing said electrolyzing until said monosulfide is formed.

References Cited in the file of this patent

UNITED STATES PATENTS

| 1,273,223 | Hirsch | July 23, 1918 |
| 2,734,855 | Buck et al. | Feb. 14, 1956 |

OTHER REFERENCES

Seaborg et al.: "The Actinide Elements," pp. 155, 405, 478, 479 (1954).

Seaborg et al.: "The Transuranium Elements," pp. 20–36 (1954).

Nuclear Science Abstracts, vol. 15, Abstract Nos. 12947 and 15592 (1961).